United States Patent
Russ et al.

[11] Patent Number: 6,165,048
[45] Date of Patent: Dec. 26, 2000

[54] CHEMICAL-MECHANICAL-POLISHING SYSTEM WITH CONTINUOUS FILTRATION

[75] Inventors: Richard D. Russ, Santa Clara; Daniel Thomas, Rippon, both of Calif.

[73] Assignee: VLSI Technology, Inc., San Jose, Calif.

[21] Appl. No.: 09/189,701

[22] Filed: Nov. 10, 1998

[51] Int. Cl.$^7$ .................................................. B24B 49/00
[52] U.S. Cl. .................................. 451/5; 451/41; 451/60; 210/193; 210/340; 210/108; 210/143
[58] Field of Search ........................ 451/41, 60; 210/193, 210/340, 108, 143

[56] References Cited

U.S. PATENT DOCUMENTS

| | | |
|---|---|---|
| 4,636,306 | 1/1987 | Radmall . |
| 4,752,386 | 6/1988 | Schulz et al. . |
| 4,906,357 | 3/1990 | Drori ........................................ 210/143 |
| 4,923,601 | 5/1990 | Drori ........................................ 210/107 |
| 5,074,999 | 12/1991 | Drori ........................................ 210/143 |
| 5,112,481 | 5/1992 | Drori ........................................ 210/193 |
| 5,393,423 | 2/1995 | Drori ........................................ 210/333.01 |
| 5,401,397 | 3/1995 | Moorehead .............................. 210/108 |
| 5,516,426 | 5/1996 | Hull et al. . |
| 5,531,798 | 7/1996 | Engstrom et al. . |
| 5,664,990 | 9/1997 | Adams et al. ............................. 451/60 |
| 5,670,038 | 9/1997 | McKinney . |
| 5,690,824 | 11/1997 | Stuth . |

FOREIGN PATENT DOCUMENTS

| | | | |
|---|---|---|---|
| 0 245 715 A2 | 4/1987 | European Pat. Off. ........ | B01D 36/04 |
| 3743508 A1 | 5/1989 | Germany ........................ | B01D 36/04 |
| 2 006 688 | 1/1980 | United Kingdom ........... | B01D 35/12 |

*Primary Examiner*—David A. Scherbel
*Assistant Examiner*—Shantese McDonald
*Attorney, Agent, or Firm*—Mikio Ishimaru

[57] ABSTRACT

A chemical-mechanical-polishing system having a slurry distribution system, a polisher, a deionized water supply, and a drain, includes a slurry filtration system. The filtration system has two filters for alternately filtering particles in slurry and being backflushed with deionized water. Two input valves have input ports connected to the slurry distribution system and output ports respectively connected to the filters for filtering. Two output valves have input ports respectively connected to the filters for receiving filtered slurry and output ports connected to the polisher. Two backflush valves have input ports connected to the deionized water supply and output ports respectively connected to backflush with deionized water; the output ports are also respectively connected to the input ports of the two output valves. Two drain valves have input ports respectively connected to the filters for receiving backflushed fluid and output ports connected to the drain. A pressure sensor disposed to sense pressure of slurry across the filters provide pressure indications which are used by control circuitry to open and close said valves to filter slurry or backflush the filters.

9 Claims, 5 Drawing Sheets

6,165,048

CHEMICAL-MECHANICAL-POLISHING SYSTEM WITH CONTINUOUS FILTRATION

TECHNICAL FIELD

The present invention relates generally to chemical-mechanical-polishing systems for processing semiconductors and more specifically to chemical-mechanical-polishing systems which include filtration systems.

BACKGROUND ART

In the past, a chemical-mechanical polishing (CMP) process was developed for planarization of semiconductor surfaces and metal inlays during manufacturing. A chemical, a base or neutral for semiconductor oxide surfaces and an acid for metals, with a number of other proprietary chemicals would be used to soften the surface material and an abrasive, such as alumina or silicon, would be used for planarization in a machine called a polisher. The chemicals have a pH range of 2 to 11 and carry the abrasive in suspension as a slurry which is kept constantly in motion to prevent separation.

As semiconductor devices were reduced in size, it became desirable to use CMP processing to obtain increasingly flat surfaces. As CMP came to be used in semiconductors with line geometries of 0.35 micron, it became common to provide filtration systems to control the size of particles reaching the polisher in order to reduce the defects caused by particle scratches. Smaller particles cause smaller scratches but with smaller line geometries, the smaller scratches still negatively affect the final semiconductor device. With sub-0.35 micron semiconductor devices, filtration systems are universally used either as part of the recirculating system for the slurry or directly in the line to the polisher.

The problem with current filtration systems is that they must compromise between the particle size that can be filtered out and the time between replacement of the filter. For example, the smaller the particle size filtered, the sooner the filter must be replaced. This filter replacement interrupts production for a significant amount of time and reduces the number of semiconductor devices which can be produced. Conversely, allowing larger particles to the polisher for longer filter life results in increased defects which also reduces the number of semiconductor devices which can be produced even though production can continue longer without interruption.

A solution, which would allow continuous filtration of small particles, has long been sought, but has also long eluded those skilled in the art. Such a solution would be highly valuable since the economics of semiconductor production equate small improvements in production to large sums of money because of the high selling price of semiconductor devices.

DISCLOSURE OF THE INVENTION

The present invention provides processing apparatus which includes a filtration system having dual filters, a valve system, pressure sensing, and controls for controlling filtering, backflushing, and precharging. The control system switches the valve system to filter in one filter while backflushing in the other. After backflushing the other filter, it is precharged with filtered fluid before the one filter is backflushed and the other begins filtering.

An advantage of the present invention is to provide a system which permits continuous filtration of large particles and cleaning of filters.

Another advantage of the present invention is to provide a system which automatically permits continuous filtration of large particles and cleaning of filters.

Another advantage of the present invention is to provide a filtration system in which the filters never need replacement.

Another advantage of the present invention is to provide a CMP system in which the filtration system can continuously filter the slurry and automatically change filters.

Another advantage of the present invention is to provide a CMP system in which the filtration system can continuously filter the slurry, clean the filters, and automatically change filters when required.

The above and additional advantages of the present invention will become apparent to those skilled in the art from a reading of the following detailed description when taken in conjunction with the accompanying drawings.

BEST MODES FOR CARRYING OUT THE INVENTION

Figure 1:
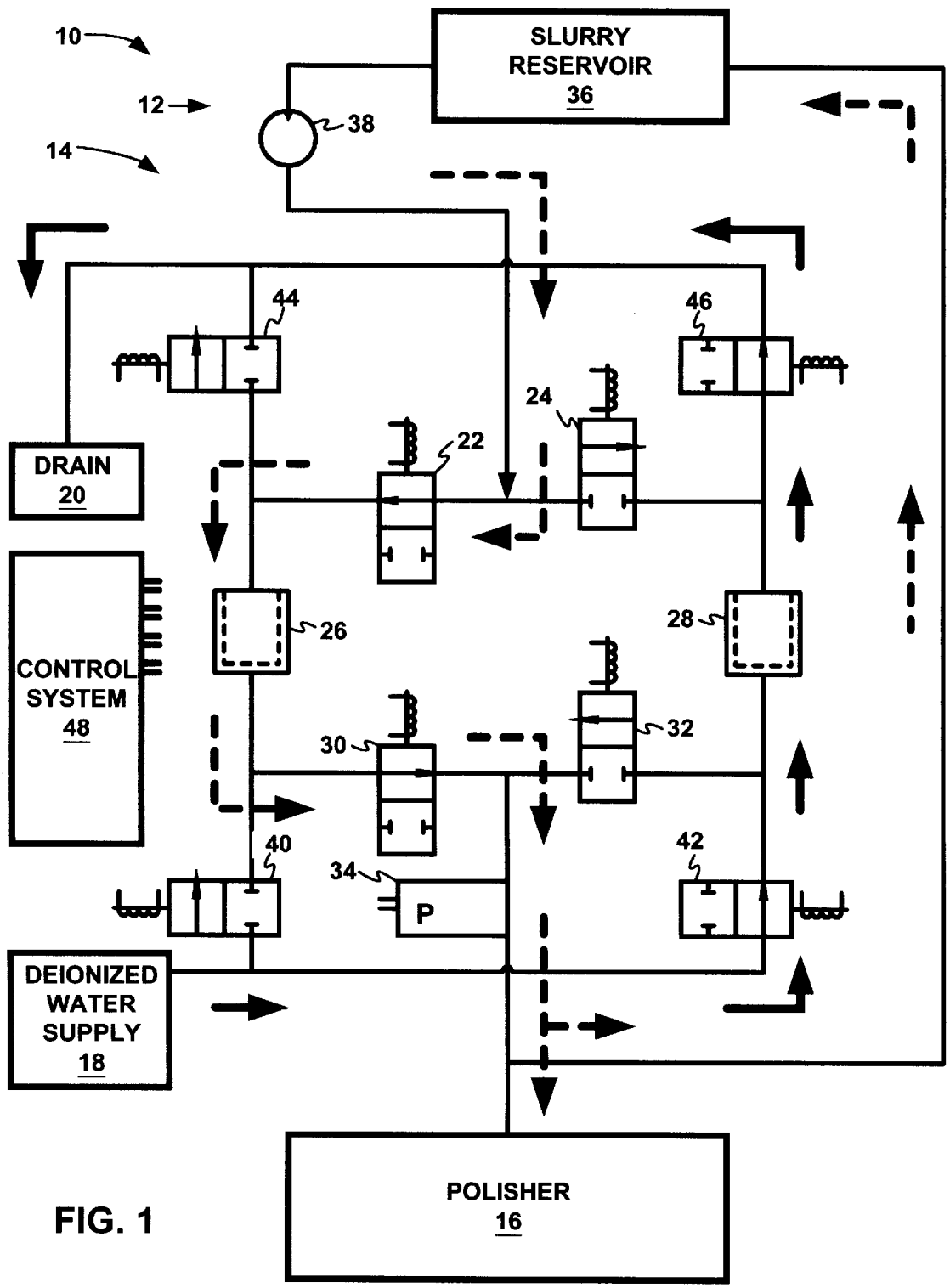
FIG. 1 is a CMP system with a recirculating CMP filtration system filtering through a first filter and backflushing a second filter.

Referring now to FIG. 1, therein is shown a chemical-mechanical polishing (CMP) system 10 which uses a particulate-containing fluid, called "slurry", for flattening oxide and metal surfaces of semiconductors. The CMP system 10 consists of a slurry distribution system 12, a CMP filtration system 14 in the recirculation line of the slurry distribution system 12, and a polisher 16. Also connected to the CMP system 10 is a source of deionized water 18 and a drain 20.

The CMP filtration system 14 includes first and second input solenoid valves 22 and 24, respectively. Each of the first and second input valves 22 and 24 have their input ports connected to the slurry distribution system 12 and their output ports respectively connected to first and second filters 26 and 28, respectively.

The first and second filters 26 and 28 can be single or multistage filters which are filter particles that are sized as a function of the line geometries of the semiconductor devices which are being polished. For example, in a 0.18 micron line geometry semiconductor device, the filters 26 and 28 would filter out particles over 10 nanometers in size in slurry flowing in a first direction through the filters. The filters 26 and 28 are backflushed by flowing deionized water through the filters in a second direction, which is the opposite of the first direction.

The first and second filters 26 and 28 are respectively connected to first and second output solenoid valves 30 and 32. Each of the first and second output valves 30 and 32 have their input ports respectively connected to said first and second filters 26 and 28, and their output ports connected to the polisher 16.

A pressure sensor 34 is located on the connection between the first and second output valves 30 and 34 and the polisher 16. The pressure sensor 34 senses the fluid pressure out of the first or second filter 26 or 28 and gives an indication thereof to cause the filtering filter to be automatically switched when it is filled to the point where a clean filler should be filtering.

It should be noted that one pressure sensor 34 is sufficient if the control system 48 is connected to the pump 38 to tell if it is running. If the CMP filtration system 14 is electrically isolated from the pump 38, an additional pressure sensor would be required at the input to the first and second input valves 22 and 24 to provide an indication of the pressure drop across the first and second filters 26 and 28. The control system would automatically shift the filtration between filters when one was filled up. Different arrangements of pressure sensors, for example across each filter, would be evident to those skilled in the art based on how desirable it is to have various fail-safe arrangements.

Between the pressure sensor 34 and the polisher 16 for the recirculating CMP filtration system 14 is the recirculating connection back to a slurry reservoir 36 in the slurry distribution system 12. The slurry distribution system 12 contains a recirculation pump 38 which causes the slurry to flow through the CMP system 10 to the polisher 16.

Also shown in FIG. 1 connected to the deionized water supply 18 are first and second backflush solenoid valves 40 and 42. Each of the first and second backflush valves 40 and 42 have input ports connected to the deionized water supply 18 and output ports, respectively, connected to the first and second filters 26 and 28 for backflushing by flowing deionized water therethrough in said second direction. The output ports of the first and second backflush valves 40 and 42 are also respectively connected to the inputs of the first and second output valves 30 and 32 in order to respectively connect the valves to the second and first filters 28 and 26.

The first and second filters 26 and 28 are connected to first and second drain solenoid valves 44 and 46. Each of the drain valves 44 and 46 have input ports respectively connected to the first and second filters 26 and 28 for receiving backflushed deionized water flow through the filters in said second direction, and output ports connected to the drain 20. The output ports of the first and second drain valves 44 and 46 are also connected to the outputs of the first and second input valves 22 and 24 in order to respectively connect the valves to the second and first filters 28 and 26.

Also shown in FIG. 1 is control circuitry 48 for responding to the pressure sensor 34 to activate the various solenoid valves in various combinations as will later be explained. The control circuitry 48 could be a simple adjustable electrical timer based system but in the best mode is a fully controllable microprocessor based system.

FIG. 1 shows the CMP system 10 with the CMP filtration system 14 in an operational mode in which the first filter 26 is filtering and the second filter 28 is being backflushed.

Figure 2:
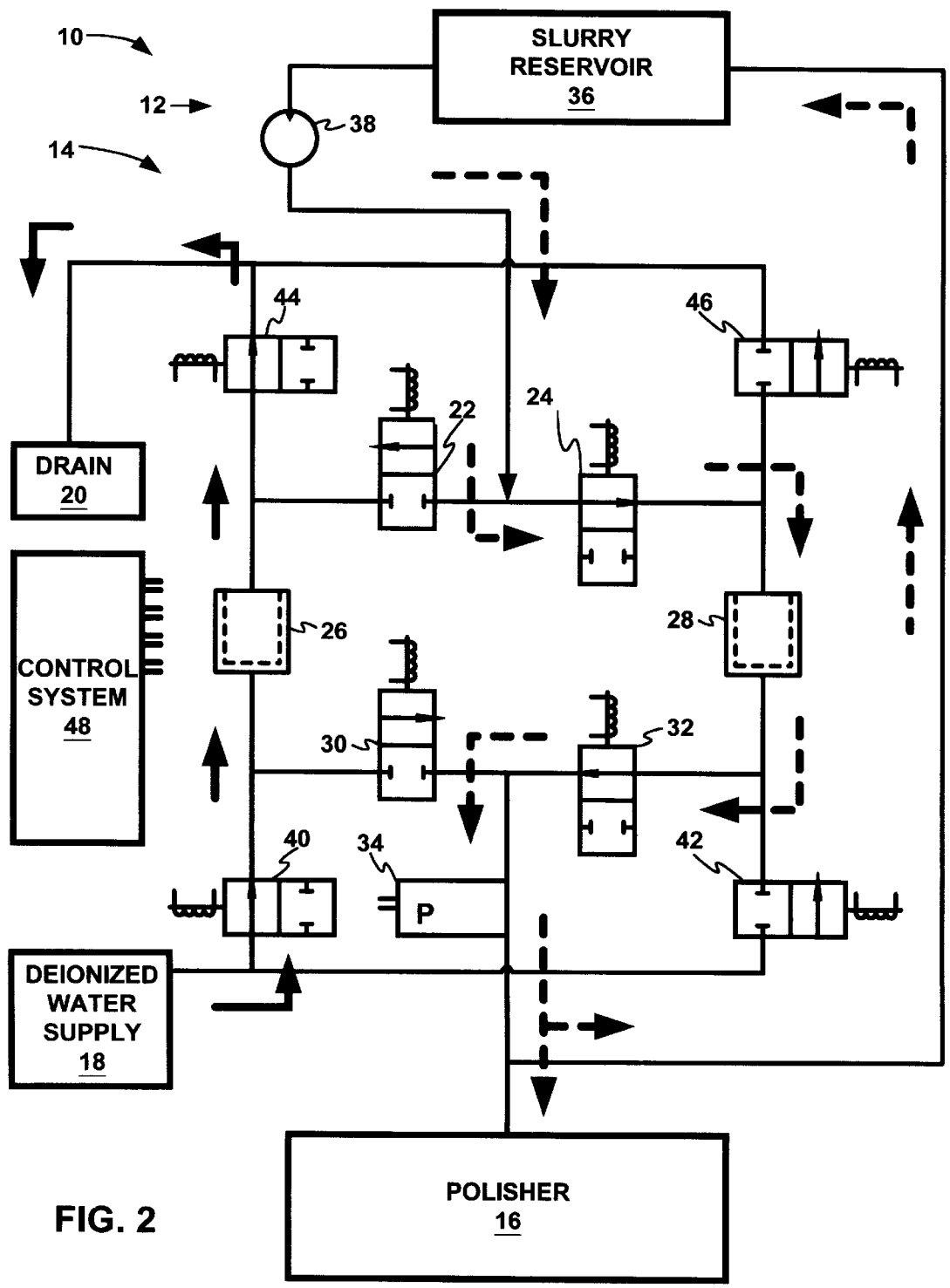
FIG. 2 is a CMP system with a recirculating CMP filtration system filtering through the second filter and backflushing the first filter.

Referring now to FIG. 2, therein is shown the CMP system 10 with the CMP filtration system 14 in a second operational mode in which the first filter 26 is being backflushed and the second filter 28 is filtering.

Figure 3:
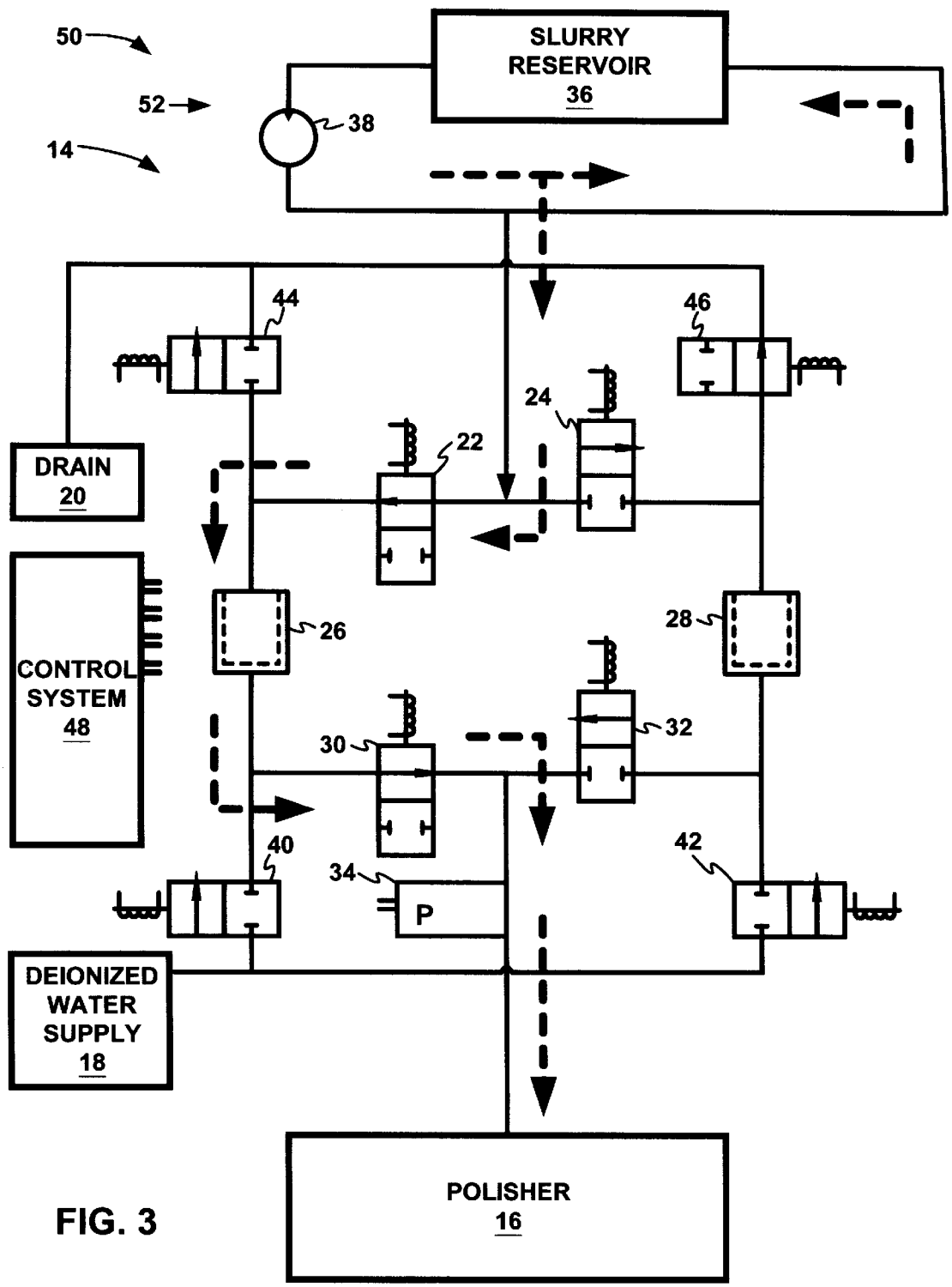
FIG. 3 is a CMP system with an in-line CMP filtration system filtering through the first filter with the backflushing of the second filter stopped.

Referring now to FIG. 3, therein is shown a CMP system 50 with the CMP filtration system 14 in-line between a recirculating slurry distribution system 52 and the polisher 16. The CMP filtration system 14 is shown in another operational mode in which the first filter 26 is filtering and the backflushing of the second filter 28 is stopped.

Figure 4:
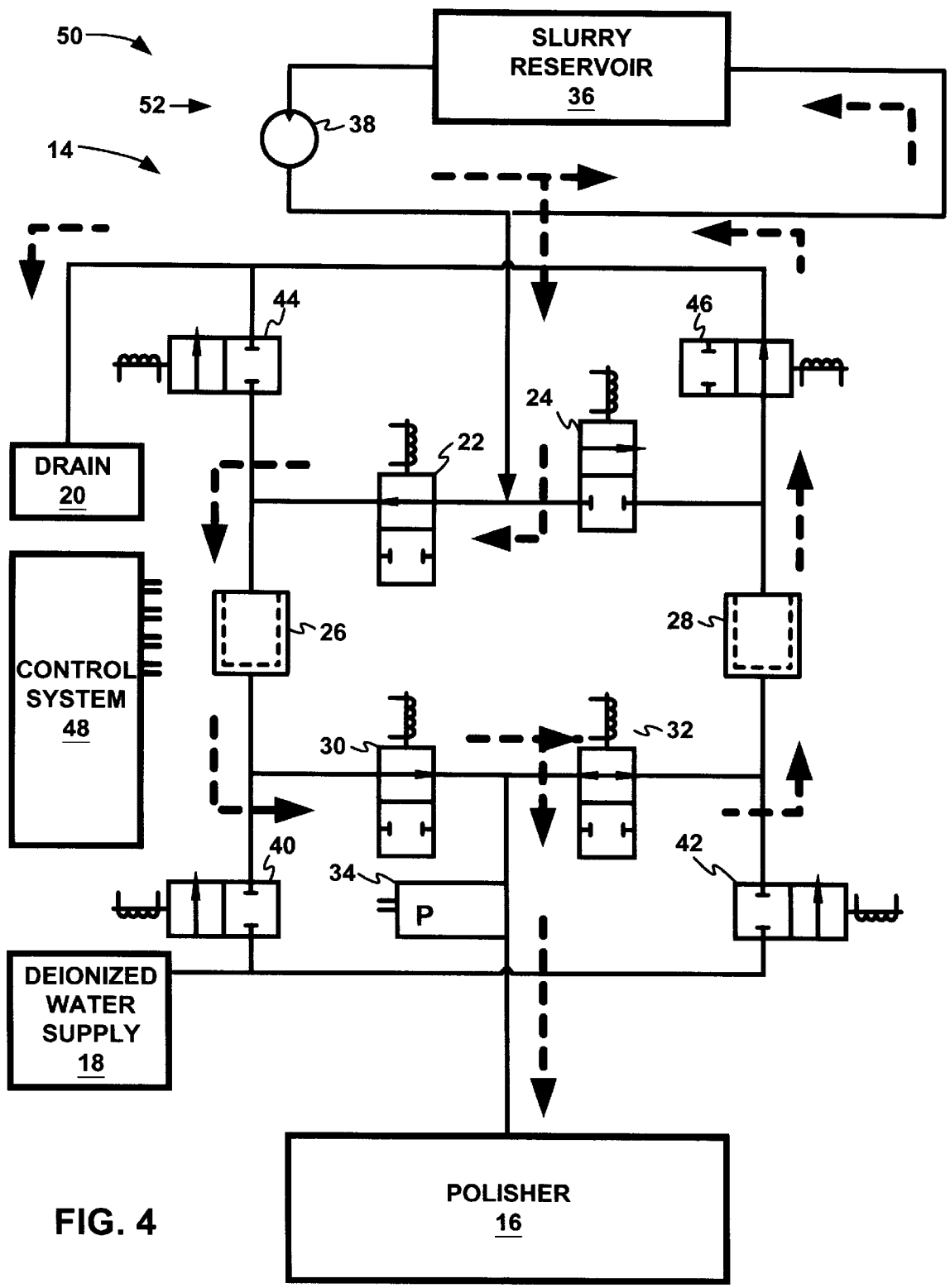
FIG. 4 is a CMP system with an in-line CMP filtration system filtering through the first filter and precharging the second filter.

Referring now to FIG. 4, therein is shown a CMP system 50 with the CMP filtration system 14 in-line between a recirculating slurry distribution system 52 and the polisher 16. The CMP filtration system 14 is shown in another operational mode in which the first filter 26 is filtering and the second filter 28 is being precharged with slurry and is connected to the drain 20 to force the deionized water from the second filter 28 before restarting filtering.

Figure 5:
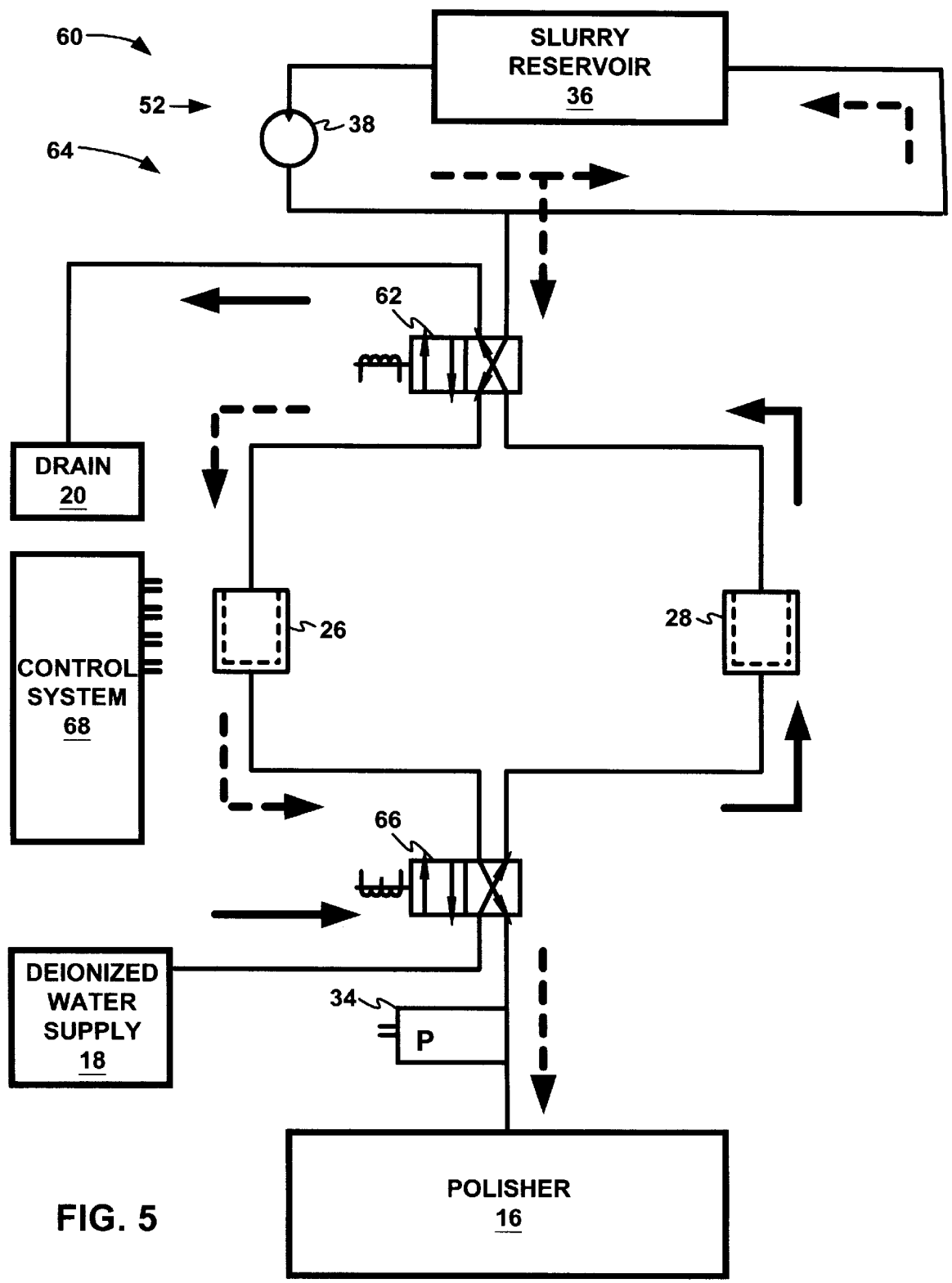
FIG. 5 is a CMP system with a simplified in-line CMP filtration system filtering through the first filter and backflushing the second filter.

Referring now to FIG. 5, therein is shown a CMP system 60 with a simplified CMP filtration system 64 in-line between the recirculating slurry distribution system 52 and the polisher 16. The common elements herein are given the same numbers as in previous FIG.'s. A four-way, two-position, input solenoid valve 62 has: a first port connected to the recirculating slurry distribution system 52; a second port to the drain 20; a third port to the first filter 26; and a fourth port to the second filter 28. A four-way, two-position, output solenoid valve 66 has: a first port to the first filter 26; and a second port to the second filter 28; a third port connected to the polisher 16; and a fourth port to the deionized water supply 18. The solenoids are controlled by a simple adjustable timer control system 68.

In operation in a first mode, as shown in FIG. 1 for filtering in the first filter 26, the slurry distribution system 12 has the pump 38 pumping slurry from the slurry reservoir 36 to the first and second input valves 22 and 24 along the direction indicated by the dotted arrows. The positions of the various solenoid valves are set by the control system 48.

The slurry is a suspension of an abrasive, such as alumina or silicon, carried generally by a neutral pH chemical or base, such as ammonium hydroxide or potassium hydroxide, for polishing semiconductor oxide surfaces and an acid, such as ferric nitrate or potassium iodate or hydrogen peroxide, for polishing metals. The slurry also contains a number of other proprietary chemicals which assist in CMP. The slurry is in a pH range of 2 to 11. Some slurries are so unstable that the abrasives tend to clump or fall out of suspension in a few hours. The slurry is kept constantly in motion to prevent separation as much as possible.

As shown in FIG. 1, the first and second input valves 22 and 24 are in the positions in which the first input valve 22 is open to allow the flow of slurry through to the first filter 26 while the second input valve 24 is off to prevent flow. The first filter 26 filters out particles larger than the optimum for the CMP polisher 16 based on the line geometries of the semiconductor device being polished.

The filtered slurry then flows to the first output valve 30 which is open to permit the slurry to flow past the pressure sensor 34 to the polisher 16. As shown, the second output valve 32 is closed. The pressure sensor 34 measures the pressure of the slurry after it passes through either the first filter 26 or the second filter 28. It is connected to the control system 48 and provides an indication when a filter is filled up with enough abrasive particles to warrant switching to the other filter and backflushing.

After flowing through the CMP filtration system 14 and past the pressure sensor 34, the slurry is also partially redirected back to the slurry distribution system 12 for recirculation before flowing on to the polisher 16 where it is used up in the CMP process.

While the slurry is being filtered in the first filter 26, the deionized water supply 18 provides deionized water along the direction of the solid arrows to the first and second backflush valves 40 and 42. The deionized water may contain a buffering chemical because some slurries are extremely sensitive to changes in pH. Changes in pH which "shock" the slurry will cause the abrasive to clump together into larger size particles or will cause the particles to come out of suspension. Thus, the buffering chemical will prevent shocking the slurry when it encounters deionized water in a previously backflushed filter.

The first backflush valve 40 is closed but the second backflush valve 42 is open to allow deionized water to flow to backflush the second filter 28. The backflushed fluid carries the large size particles from the second filter 28 to the second input valve 24 which is closed and through the second drain valve 46 which is open. From the second drain valve 46, the backflushed fluid flows to the drain 20. It should be understood that the drain 20 may be a reclamation system or further processing system rather than just a plain drain.

In operation in a second mode, as shown in FIG. 2 for filtering in the second filter 28, the slurry distribution system 12 has the pump 38 pumping slurry from the slurry reservoir 36 to the first and second input valves 22 and 24 along the direction indicated by the dotted arrows. The positions of the various solenoid valves are set by the control system 48.

As shown in FIG. 2, the first and second input valves 22 and 24 are in the positions in which the first input valve 22 is off to prevent flow while the second input valve 24 is open to allow the flow of slurry through to the second filter 28. The second filter 28 filters out particles larger than the optimum for the CMP polisher 16 based on the line geometries of the semiconductor device being polished. The filtered slurry then flows to the second output valve 32 which is open to permit the slurry to flow past the pressure sensor 34 to the polisher 16. As shown, the first output valve 30 is closed. Once past the pressure sensor 34, which measures the pressure drop of the fluid through the CMP filtration system 14 and indicates the degree to which the filtering filter is filled up, the slurry is also partially redirected to the slurry distribution system 12 for re-circulation.

While the slurry is being filtered in the second filter 28, the deionized water supply 18 provides deionized water, which may include a buffering chemical, along the direction of the solid arrows to the first and second backflush valves 40 and 42. The first backflush valve 40 is open to allow deionized water to flow to backflush the first filter 26 but the second backflush valve 42 is closed. The backflushed fluid from the first filter 26 flows to the first input valve 22 which is closed and through the first drain valve 44 which is open. From the first drain valve 44, the backflushed fluid flows to the drain 20.

In operation, as shown in FIG. 3 for filtering in the first filter 26 and stopping backflushing to conserve deionized water, the slurry distribution system 12 has the pump 38 pumping slurry from the slurry reservoir 36 to the first and second input valves 22 and 24 along the direction indicated by the dotted arrows. The positions of the various solenoid valves are set by the control system 48.

As shown in FIG. 3, the first and second input valves 22 and 24 are in the positions in which the first input valve 22 is open to allow the flow of slurry through to the first filter 26 while the second input valve 24 is off to prevent flow. The first filter 26 filters out particles larger than the optimum for the CMP polisher 16 based on the line geometries of the semiconductor device being polished.

The filtered slurry then flows to the first output valve 30 which is open to permit the slurry to flow past the pressure sensor 34 to the polisher 16. As shown, the second output valve 32 is closed. The pressure sensor 34, which measures the pressure drop of the fluid through the CMP filtration system 14, indicates the degree to which the filtering filter is filled up.

While the slurry is being filtered in the first filter 26, the deionized water supply 18 stops providing deionized water because the control system 48 causes the first and second backflush valves 40 and 42 to be closed.

In operation, as shown in FIG. 4 for filtering in the first filter 26 and precharging the second filter 28, the slurry distribution system 12 has the pump 38 pumping slurry from the slurry reservoir 36 to the first and second input valves 22 and 24 along the direction indicated by the dotted arrows. The positions of the various solenoid valves are set by the control system 48.

After backflushing a filter, it is desirable to "precharge" the filter by sending slurry through it because the residual deionized water which is used in the backflushing can shock the slurry and cause the abrasive to fall out of suspension.

A "precharging" mode is shown in FIG. 4. The slurry from the first output valve 30 would have a portion diverted to the second output valve 32 which would be open. The first and second backflush valves 40 and 42 would be closed, the second input valve 24 would be closed, and the second drain valve 46 would be open. In this mode, the slurry would flow from the second output valve 32 back through the second filter 28 to the second drain valve 46 and to the drain 20, and the residual deionized water flows through the open second drain valve 46 into the drain 20. Since the large size particles would be filtered out by the first filter 26, the reverse flow of slurry through the second filter 28 would not fill it up.

After precharging, the second drain valve 46 would be closed and the control system 48 would set the solenoid valves in the CMP filtration system 14 to filter through the second filter 28 and backflush the first filter 26.

In operation, as shown in FIG. 5 for filtering in the first filter 26, the slurry distribution system 52 has the pump 38 pumping slurry from the slurry reservoir 36 to the input valve 62 along the direction indicated by the dotted arrows. The positions of the two solenoid valves 62 and 66 are set by the adjustable timer control system 68.

As shown in FIG. 5, the input valve 62 is in a first position in which the flow of slurry is through to the first filter 26. From the first filter 26, the slurry flows to the output valve 66 which is also in the first position which directs the flow to the polisher 16. With the valves 62 and 66 in their first positions, the deionized water supply is connected through the output valve 66 to backflush the second filter 28. The backflushed fluid from the second filter 28 then flows through the input valve 62 to the drain 20.

When the adjustable time control system 68 is set based on the expected service time to filter fillup, it will switch the valves 62 and 66 to their second positions. In the second positions, the slurry is pumped through the input valve 62 to the second filter 28 and then through the output valve 64 to the polisher 16. At the same time, the deionized water will flow through the output valve 66 to backflush the first filter 26. The deionized water carrying the particulates from the first filter 26 will exit through the input valve 62 to the drain 20.

As would be evident to those skilled in the art, while the best modes have been described using separate commercially available solenoid valves, a single custom solenoid valve with appropriate internal valve parts could accomplish all the functions described herein. For example, a single four-position, four-way valve could provide all four modes of operation.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims. All matters set forth herein or shown in the accompanying drawings are to be interpreted in an illustrative and non-limiting sense.

The invention claimed is:

1. Apparatus comprising:

a source of particulate containing fluid;

a user of particulate containing fluid;

a source of backflushing fluid;

a drain for said fluids;

a first filter;

a second filter;

valving means for respectively connecting in first and second modes:

said source of particulate containing fluid through said first filter to said user of said particulate containing fluid and said source of backflushing fluid through said second filter to said drain for said fluids; and said source of particulate containing fluid through said second filter to said user of said particulate containing fluid and said source of backflushing fluid through said first filter to said drain for said fluids;

said valving means includes precharging valving means for connecting said source of particulate containing fluid to said first filter during said second mode and said second filter during said first mode; and a control system for changing said valving means between said first and second modes.

2. Apparatus as claimed in claim 1 including pressure sensing means for sensing fluid pressure at said first and second filters and providing an indication thereof to said control system, and wherein said control system includes means for causing said valving means to shift between said first and second modes in response to predetermined indications of said fluid pressure at said first and second filters.

3. Apparatus as claimed in claim 1 including pressure sensing means for sensing the pressure drop across said first and second filters and providing an indication thereof to said control system, and wherein said control system includes means for causing said valving means to shift between said first and second modes in response to said indication of the pressure drop across said first and second filters.

4. Apparatus as claimed in claim 1 wherein said valving means includes backflush valving means for respectively isolating said source of backflushing fluid from said first and second filters during said first and second modes.

5. Apparatus as claimed in claim 1 wherein said valving means includes drain valving means for connecting said drain to said first filter during said second mode and to said second filter during said first mode.

6. Apparatus as claimed in claim 1 wherein control system includes means for causing said valving means to: connect said source of particulate containing fluid alternately through said first and second filters to said user of particulate containing fluid; connect said source of particulate containing fluid to both said first and second filters; and connect said first and second filters individually to said drain for said fluids.

7. Apparatus as claimed in claim 1 wherein control system includes means for causing said valving means to: connect said source of particulate containing fluid alternately through said first and second filters to said user of particulate containing fluid; connect said source of particulate containing fluid to both said first and second filters; connect said source of backflushing fluid alternatively through said first and second filters to said drain for said fluids; and connect said first and second filters individually to said drain for said fluids.

8. Apparatus as claimed in claim 1 wherein said source of particulate containing fluid provides for circulation of a portion of said particulate containing fluid to said user of said particulate containing fluid through said first filter in said first mode and through said second filter in said second mode and back to said source of particulate containing fluid.

9. Apparatus as claimed in claim 1 wherein said source of particulate containing fluid provides for circulation of a portion of said particulate containing fluid therein and the remainder to said user of particulate containing fluid through said first filter in said first mode and through said second filter in said second mode.

\* \* \* \* \*

UNITED STATES PATENT AND TRADEMARK OFFICE
CERTIFICATE OF CORRECTION

PATENT NO. : 6,165,048
DATED : December 26, 2000
INVENTOR(S) : Richard D. Russ and Daniel Thomas It is certified that error appears in the above-identified patent and that said Letters Patent is hereby corrected as shown below:

Column 3,
Line 10, delete "filler" and insert -- filter --

Signed and Sealed this

Twenty-fifth Day of September, 2001

Attest:

*Nicholas P. Godici*

NICHOLAS P. GODICI
*Attesting Officer*    *Acting Director of the United States Patent and Trademark Office*